US008090055B2

(12) United States Patent
Lui et al.

(10) Patent No.: US 8,090,055 B2
(45) Date of Patent: Jan. 3, 2012

(54) BINARY CONTINUOUS PHASE MODULATION (CPM) DATA DEMODULATION RECEIVER

(75) Inventors: Gee L. Lui, Westminster, CA (US); Kuang Tsai, Santa Ana, CA (US)

(73) Assignee: The Aerospace Corporation, El Segundo, CA (US)

( * ) Notice: Subject to any disclaimer, the term of this patent is extended or adjusted under 35 U.S.C. 154(b) by 705 days.

(21) Appl. No.: 12/221,712

(22) Filed: Aug. 6, 2008

(65) Prior Publication Data

US 2010/0034318 A1 Feb. 11, 2010

(51) Int. Cl.
*H04L 27/22* (2006.01)
(52) U.S. Cl. ............ 375/324; 375/274; 375/340
(58) Field of Classification Search .......... 375/340, 375/274, 336, 324, 302; 370/44, 42
See application file for complete search history.

(56) References Cited

U.S. PATENT DOCUMENTS

| | | | | |
|---|---|---|---|---|
| 5,712,877 | A * | 1/1998 | Ho et al. | 375/284 |
| 6,148,040 | A * | 11/2000 | Nguyen et al. | 375/326 |
| 6,198,908 | B1 * | 3/2001 | Grenabo | 455/44 |
| 6,466,630 | B1 * | 10/2002 | Jensen | 375/327 |
| 7,072,414 | B1 * | 7/2006 | Lui et al. | 375/274 |
| 2006/0274862 | A1 * | 12/2006 | Lui et al. | 375/341 |

OTHER PUBLICATIONS

Steve C.Thompson, "Constant Envelope OFDM Phase Modulation", Doctor of Philosophy, Electrical Engineering, University of California, 2005.*
P. Bianchi, P. Loubaton and F.Sirven,"Blind joint estimation of the technical parameters of continuous phase modulated signals", Equipe Signal pour les Communications, UMLV, Marne-La-Vallee, France, 2003 IEEE.*
Lui et al.,"Viterbi and Serial Demodulators for Precoded Binary GMSK, " ITC Proceedings, pp. 676-683, Las Vegas NV, 1999.

* cited by examiner

*Primary Examiner* — Chieh M Fan
*Assistant Examiner* — Aristocratis Fotakis
(74) *Attorney, Agent, or Firm* — K&L Gates LLP

(57) ABSTRACT

A communications receiver receives a received continuous phase modulation (CPM) signal having an original modulation index of h and includes a filter, a continuous phase reconstructor using phase unwrapping, and a modulation index scaler for generating a reconstructed CPM signal having a scaled modulation index H from the received CPM signal having a small modulation index h, with the scaled modulation index H preferably being greater than the original modulation index h, so that, the transmitted CPM signal occupies a narrow bandwidth, yet, during reception, the reconstructed CPM signal with the high modulation index H can be reliably data demodulated for improved performance with reduced demodulation complexity.

10 Claims, 1 Drawing Sheet

PRE-CODED BINARY CPM DATA DEMODULATOR

PRE-CODED BINARY CPM DATA DEMODULATOR

BINARY CONTINUOUS PHASE MODULATION (CPM) DATA DEMODULATION RECEIVER

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of continuous phase modulation communication systems. More particularly, the present invention related to a demodulator for demodulating communicated precoded continuous phase modulation signals.

BACKGROUND OF THE INVENTION

Continuous phase modulation (CPM) signals are phase-modulated signals having a spectral occupancy that can be tailored to fit limited transmission bandwidths through suitable pre-modulation filtering. Moreover, unlike non-constant envelope signals, such as amplitude-modulated signals or filtered phase-modulated signals, the CPM signals have a constant envelope and allow saturated power amplifier operation for maximum power efficiency. These desirable signal properties, desirable by the rising premium being placed on bandwidth and power efficiency, have resulted in the use of CPM signals, such as binary Gaussian Minimum Shift Keying (GMSK) being deployed in operational terrestrial and satellite communication systems.

Inventors Gee L. Lui and Kuang Tsai taught precoding in a low complexity CPM serial demodulator in "Viterbi and Serial Demodulators for Precoded Binary GMSK", on pp. 676-683, ITC Proceedings, Las Vegas, Nev., 1999. The low complexity CPM serial demodulator operated in combination with the binary CPM GMSK modulator. The binary CPM GMSK modulator received a serial bit data stream that was precoded into a symbol steam by a precoder. The symbols were then modulated by a binary CPM GMSK modulator having a L=1/BT memory length with a modulation index h of ½, where B is the modulation bandwidth and T is the symbol time. The low complexity serial demodulator was described in terms of reduced complexity. The use of data precoding by the precoder in the transmitter enables data decisions by the serial demodulator to be simply made by alternately sampling the sign, using a sampler and a threshold, of the inphase and quadrature components at the output of a phase amplitude modulated (PAM) matched-filter $h_0(-t)$. The PAM matched filter filtered the fundamental Laurent components embedded in the received CPM signal.

The advantages of the serial demodulator are its simplicity as well as the ease of generating metrics for soft decision decoding. The decoding metrics were obtained by directly quantizing, into the required number of bits, the respective inphase or quadrature components of the PAM filter output at sampling instances. The disadvantage of the serial demodulator is that its performance may be severely limited by intersymbol interference (ISI), particularly for small bandwidth-time (BT) products.

To mitigate the problem of ISI, an equalizer was used. ISI refers to the spreading of a data pulse over several bit intervals. ISI is an inherent characteristic of a smooth and spectrally compact modulation waveform, such as GMSK, and a direct consequence of the reciprocal spreading theorem of the Fourier transform, which states that a pulse that is long in time is necessarily narrow in frequency, and vice versa. For a CPM GMSK signal, each data pulse is spread among the set of $Q=2^{L-1}$ Laurent pulses with pulse periods ranging from $(L+1)T$ for the dominant Laurent component $h_0(t)$ to T for the weakest Laurent component. Upon reaching the detection filter of the serial demodulator, these Laurent pulses are further spread by the detection filter $h_0(-t)$ resulting in a total data pulse spread as large as $2(L+1)$ bit periods. Because the autocorrelation function of $h_0(t)$ vanishes at $\pm(L+1)T$, a signal sample taken at bit time nT is corrupted by L preceding data bits as well as L succeeding data bits, resulting in ISI, where n is the symbol index. The presence of ISI in the signal sample causes the signal to randomly deviate from its expected value and could greatly impair the decision ability to make correct bit decisions, even in the absence of receiver noise. The effect of ISI on bit detection is generally data pattern dependent and can be effectively mitigated using a least mean square (LMS) equalizer, which operates to minimize the square of the error of the signal sample from the expected value. A LMS equalizer, also known as a transversal equalizer, can be implemented using a tap delay line, a set of multipliers and a multiple-input summer. For BT values of ⅓ to ⅙, it was determined that no more than three taps are needed in each case to provide a near-optimal performance of the LMS equalizers. For BT values of ½ and greater and over the bit SNR range of 0 dB to 10 dB, the performance of the serial demodulator, without an equalizer, is nearly the same as coherent BPSK performance, and thus, equalization is deemed unnecessary for these larger BT values.

The CPM GMSK modulator operation is defined by the bandwidth-time products BT, a modulation index h, and the symbol time period T. A Gaussian modulation filter has a memory length L where $L=1/BT$. The equalizer is used to solve the problem of high ISI for low BTs. However, the modulation index h presents further detection problems when the value of h is low. Small modulation index partial response precoded binary CPM signals have very narrow bandwidth occupancy and are attractive modulation indexes for use in the design of high-capacity and bandwidth-limited communication systems. However, conventional detection of these narrow-band modulation signals is complex and entails a high complexity data demodulator. Small modulation index partial-response CPM signals are very bandwidth efficient but difficult and complex to demodulate using conventional linear receivers. These and other disadvantages are solved or reduced using the invention.

SUMMARY OF THE INVENTION

An object of the invention is to improve the demodulation of continuous phase modulation (CPM) signals.

Another object of the invention is to improve the demodulation of CPM signals having a low modulation index.

Yet another object of the invention is to provide a demodulator for translating CPM signals generated using a low modulation index, into an equivalent high modulation index CPM signal.

Still another object of the invention is to provide a demodulator for translating CPM signals generated using a low modulation index, into equivalent high modulation index CPM signals for improved data detection.

A further object of the invention is to provide a receiver for reconstructing received CPM signals generated using a low modulation index, into equivalent high modulation index CPM signals for improved data detection by using a phase unwrapper for removing phase discontinuities.

Yet a further object of the invention is to provide a receiver for reconstructing received CPM signals generated using a low modulation index, into equivalent high modulation index reconstructed CPM signals for improved data detection using a conventional demodulator.

The invention is directed to a simple-to-implement non-linear receiver for demodulating narrow-band received CPM signals. A received CPM signal having an original modulation index h is reconstructed into a reconstructed CPM signal having a scaled modulation index H using phase unwrapping. The reconstructed CPM signal can then be fed into a conventional serial demodulator for data detection. The technique is applicable to any binary CPM signal and is preferably applicable to demodulating a binary CPM signal having an arbitrarily small modulation index h. The total demodulation process is a non-linear reconstruction process that generates a reconstructed CPM signal characterized by a high modulation index that can then be demodulated in the receiver.

An advantage of the non-linear data demodulator is the reduction in complexity of a demodulator for small modulation index CPM signals. An additional advantage is that the data demodulation receiver provides a low-complexity method to optimize the use of limited communication bandwidths by changing the CPM modulation index after reception. The data demodulation process enables the generation of a reconstructed CPM signal from the received small modulation index CPM signal that allows for reduced-complexity of data demodulation of the reconstructed signal for synchronization for improved data detection. These and other advantages will become more apparent from the following detailed description of the preferred embodiment.

DETAILED DESCRIPTION OF THE PREFERRED EMBODIMENT

Figure 1:
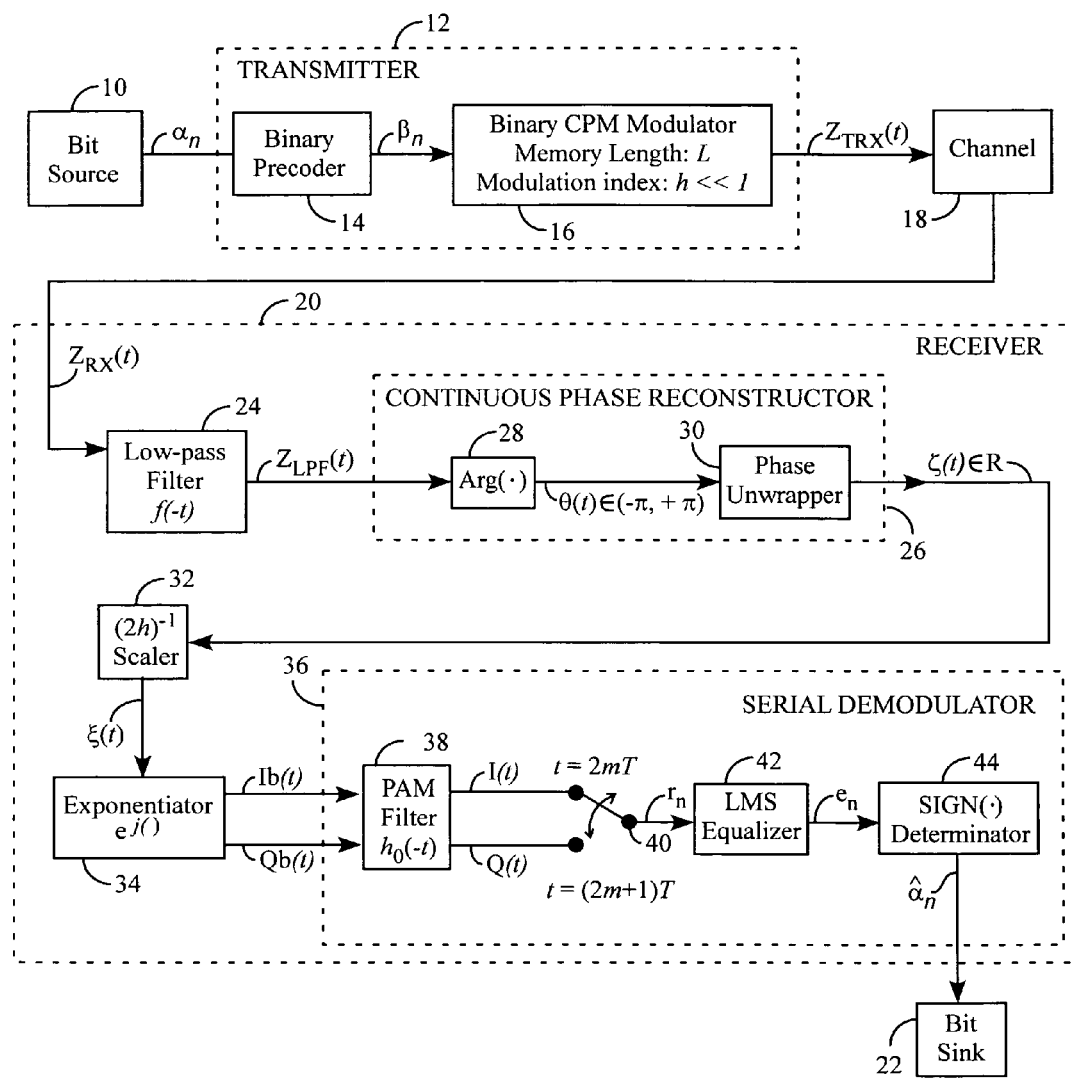
FIG. 1 is a block diagram of a precoded binary reconstructed continuous phase modulation (CPM) demodulation system having a conventional transmitter and a reduced complexity receiver.

An embodiment of the invention is described with reference to the FIG. 1 using reference designations as shown in the drawing. A bit source 10 provides a serial bit stream $\alpha_n$ to a modulator 12 including a binary precoder 14 for generating a $\beta_n$ serial symbol stream fed to a binary continuous phase modulation (CPM) modulator 16 having a memory length L and a modulation index h. The modulator 16 can be a GMSK modulator using a Gaussian filter, not shown. The modulator 16 provides a $Z_{TX}(t)$ transmitted CPM signal from the transmitter 12. The $Z_{TX}(t)$ transmitted CPM signal is a CPM signal communicated through a channel 18, such as an average white Gaussian noise (AWGN) channel 18.

The $Z_{TX}(t)$ transmitted CPM signal includes noise as a $Z_{RX}(t)$ received CPM signal received by a demodulation receiver 20 for generating an $\hat{\alpha}_n$ estimated serial bit stream of the original $\alpha_n$ serial bit stream from the bit source 10. The $\hat{\alpha}_n$ an estimated serial bit stream is then fed to bit sink 22 for data collection. The receiver 20 would include conventional tracking loops, not shown, for carrier tracking of the $Z_{RX}(t)$ received signal. The $Z_{RX}(t)$ received CPM signal is received by a f(−t) low pass filter 24 for providing a $Z_{LPF}(t)$ low pass filtered signal that is fed into a continuous phase reconstructor 26. The reconstructor 26 includes an argumentor 28 for providing a θ(t) discontinuous phase signal and includes a phase unwrapper 30 for providing a ζ(t) unwrapped continuous phase signal from the θ(t) discontinuous phase signal. The ζ(t) unwrapped continuous phase signal is fed into a (2h)$^{-1}$ scaler 32 for generating a ξ(t) normalized continuous phase signal ξ(t) that is in turn fed to a $e^{j(\ )}$ exponentiator 34 for generating a reconstructed CPM signal. The reconstructed CPM signal is a complex signal having Ib inphase and Qb quadrature components. The filter 24, the reconstructor 26, the scaler 32, and the exponentiator 34 collectively serve to translate the received CPM signal into the reconstructed CPM signal comprising the Ib inphase and Qb quadrature CPM components. The reconstructed CPM signal, having the Ib and Qb quadrature CPM components, is communicated to a serial demodulator 36 for generating the $\hat{\alpha}_n$ estimated serial bit stream that is in turn communicated to the bit sink 22.

The serial demodulator 36 includes a $h_0(-t)$ pulse amplitude modulated (PAM) filter for generating a PAM filtered signal having I(t) inphase and Q(t) quadrature components. The serial demodulator 36 further includes a sampler 40 for sampling the I(t) inphase and Q(t) quadrature components respectively and alternately at time instances t=2mT and t=(2m+1)T, where m is the sampling index, and t are the sampling times, for generating serial $r_n$ unequalized samples. The serial demodulator 36 further includes a least mean square (LMS) equalizer 42 and a sign determinator 44. The $r_n$ unequalized serial samples are fed into the LMS equalizer for generating $e_n$ equalized samples that are, in turn, fed into the sign determinator 44 for generating the $\hat{\alpha}_n$ estimated serial bit stream. The bit source 10, transmitter 12, channel 18, and serial demodulator 36 are well known and used in an ordinary manner.

In the transmitter 12, the binary source data bits $\alpha_n$ are first preferably precoded into modulator input symbols $\beta_n$ by an encoding rule $\beta_n = \{\alpha_0, n=0; (-1)^n \alpha_n \alpha_{n-1}, n \geq 1\}$, where $\alpha_n \in \{\pm\}$ and $\beta_n \in \{\pm 1\}$, and where n is the symbol index. Signed precoding permits the eventual data demodulation to be carried out without undergoing an otherwise-required performance-degrading differential decoding. The binary CPM modulator 16 is driven by the input symbol sequence $\beta_n$ forming the $Z_{TX}(t)$ transmit signal defined by a complex envelope equation $$Z_{TX}(t) = A \cdot \exp\left[j \cdot (\pi h) \sum_{n=0}^{\lfloor t/T \rfloor} \beta_n \cdot q(t-nT)\right].$$

In the complex envelope equation, T≡symbol duration, q(t)≡ CPM phase pulse, q(t)=0 for t∈(−∞, 0], and q(t)=1 for t∈ [LT, +∞), where t is time and L is the memory length time span, where L=1/BT, for generating a pulse response by a Gaussian shaping filter having a bandwidth B. The complex envelope of the $Z_{RX}(t)$ received CPM signal from the channel 18 is processed in the reduced-complexity receiver 20.

The $Z_{RX}(t)$ received CPM signal has an envelope that is low-pass filtered by the low pass filter (LPF) 24 for generating a low pass signal $Z_{LPF}(t)$ to limit channel noise. Next, the continuous phase of the $Z_{LPF}(t)$ low pass filtered signal is extracted by the continuous phase reconstructor 26 providing an unwrapped continuous phase signal ζ(t) that is then scaled for normalization by a factor of H=(2h)$^{-1}$ to form the phase of the reconstructed CPM signal with a scaled modulation index of H=½. The continuous phase reconstructor 26 includes the argumentor 28 providing a phase extracting arctangent function followed by a phase unwrapping function of the phase unwrapper 30. The phase unwrapper 30 reconstitutes a continuous phase process of the unwrapped continuous phase signal ζ(t) from a noncontinuous input phase process of the discontinuous phase signal θ(t) from the argumentor 28. The operation of the phase unwrapper 30 is mathematically defined by: $\zeta(t)=\theta(t)-2\pi \cdot R((\theta(t)-\zeta(t-T/N))/2\pi)$ where $R(x)=\{\lfloor x \rfloor, x-\lfloor x \rfloor \in [0.0, 0.5; \lfloor x \rfloor+1, x-\lfloor x \rfloor \in [0.5, 1.0),$ and where N=samples per symbol.

The unwrapped continuous phase signal ζ(t) from the phase unwrapper 30 is scaled by the scaler 32 for providing a normalized continuous phase signal ξ(t). A complex exponential function of the exponentiator 34 provides a normalized complex signal envelope from the normalized continuous phase process ξ(t) for providing the reconstructed CPM signal having the Ib(t) inphase and Qb(t) quadrature components. The reconstructed CPM signal is the same as a received CPM signal but effectively generated using the scaled modulation index of H=½, whereas, the received CPM signal $Z_{RX}(t)$ is generated using an original modulation index h at the modulator 16 in which the original modulation index h may be much less than one. In this manner, a received CPM signal that is generated using an original modulation index h, which may have a low value, can be reconstructed into a reconstructed CPM signal having a much higher scaled modulation index H. As such, the LPF filter 24, reconstructor 26, scaler 32, and exponentiator 34 generate the reconstructed CPM signal from an originally transmitted CPM signal, but with the reconstructed CPM signal having a scaled modulation index H that is preferably different and most preferably greater than the original modulation index h, that is, H>h where h<<1.

The reconstructed CPM signal having a scaled modulation index H, is communicated to the serial demodulator 36 and more particularly to the PAM filter 38, which is a matched filter matched to the principal Laurent components associated with the reconstructed CPM signal having the scaled modulation index H=½. The PAM filtered signal having I(t) inphase and Q(t) quadrature PAM components is then sampled by the sampler 40, equalized by the LMS equalizer 42, and data detected according to the algebraic signs of either the inphase or the quadrature matched filter output samples by the sign determinator 44 for generating the $\alpha_n$ estimated serial bit stream.

In preferred operation, a binary precoded received CPM signal having a small modulation index h is transformed upon reception, that is, reconstructed, into a reconstructed CPM signal having a modulation index H=½ using the continuous phase reconstructor 26, a phase scaler 32, and the complex exponentiator 34. The resulting CPM signal is a reconstructed CPM signal characterized by having a scaled modulation index H. The reconstructed CPM signal can then be demodulated using a conventional low-complexity CPM serial demodulator. The performance of the reduced-complexity data receiver is exemplified for a precoded binary Gaussian minimum-shift keying (GMSK) signal with various BT-products and with a modulation index of h=½. The ideal low-pass filter 24 can provide a two-sided bandwidth of 1/T and a two-sided impulse response truncation width of 20 T.

The CPM signal reconstruction is well suited for binary CPM signals with a small modulation index h. Performance simulation data has demonstrated the effectiveness for use in a Gaussian noise channel 18. The receiver 20 uses non-linear modulation index transformation that reconstructs the complex reconstructed CPM signal from a complex CPM received signal. The reconstructed CPM signal is scaled in continuous phase so that the reconstructed CPM signal has an effective scaled modulation index H that is preferably greater than the original modulation index h. The reconstructed CPM signal with a high scaled modulation index H with continuous-phase can then be demodulated by using a single matched-filter in the serial data demodulator 36. The binary precoder 14 and the equalizer 42 are optional elements that can be used for improved performance. The reconstruction of the received CPM signal is accomplished using the low pass filter 24, the continuous phase reconstructor 26, and the scaler 32 providing the ξ(t) normalized continuous phase signal that is transformed into a complex form by the exponentiator 34 for generating Ib and Qb complex quadrature components for data detection. The reconstructor 26 enables the generation of the reconstructed CPM signal having a high modulation index H from the received CPM signal having a small modulation index h. The reconstruction allows for reduced-complexity in data demodulation for improved synchronization for data detection.

The reduced-complexity data demodulation receiver is well suited for improving the performance of small modulation index CPM communications systems. The demodulation is a non-linear reconstruction process that generates a reconstructed CPM signal characterized by a high modulation index. An advantage of the non-linear data demodulator is the significant reduction in complexity of a demodulator for small modulation index CPM signals. An additional advantage is that the demodulator provides a low-complexity method to optimize the use of a limited communication bandwidth by changing the CPM modulation index upon reception. Those skilled in the art can make enhancements, improvements, and modifications to the invention, and these enhancements, improvements, and modifications may nonetheless fall within the spirit and scope of the following claims.

What is claimed is:

1. A receiver for receiving a received continuous phase modulated (CPM) signal having an original modulation index and providing a scaled CPM signal having a scaled modulation index, the receiver comprising, a filter for filtering the received CPM signal into a filtered signal, a reconstructor for removing phase discontinuities of the filtered signal and for reconstructing the filtered signal into a continuous phase signal, a scaler for phase scaling the continuous phase signal into a normalized CPM signal characterized by having the scaled modulation index, an exponentiator for exponentiating the normalized CPM signal into a reconstructed CPM signal having inphase and quadrature CPM components, and a demodulator for demodulating the reconstructed CPM signal into an estimated serial bit stream of an original serial bit stream encoded in the received CPM signal.

2. The receiver of claim 1 wherein the reconstructor comprises, an argumentor for providing a discontinuous phase signal from the filter signal, and a phase unwrapper for unwrapping the discontinuous phase signal into the continuous phase signal.

3. The receiver of claim 1 wherein the reconstructor comprises, an argumentor for providing a discontinuous phase signal from the filtered signal through an arctangent function, and a phase unwrapper for unwrapping the discontinuous phase signal into the continuous phase signal.

4. The receiver of claim 1 wherein, the filter is a low pass filter.

5. The receiver of claim 1 wherein, the scaled modulation index is greater than the original modulation index.

6. The receiver of claim 1 wherein, the original modulation index is less than one, and the scaled modulation index is greater than the original modulation index.

7. A receiver for receiving a received continuous phase modulated (CPM) signal encoding an original bit stream and having an original modulation index and for providing an estimate of the original bit stream, the receiver comprising,
- a filter for filtering the received CPM signal into a filtered signal,
- a reconstructor for removing phase discontinuities of the filtered signal and for reconstructing the filtered signal into a continuous phase signal, and
- a scaler for phase scaling the continuous phase signal into a normalized CPM signal characterized by having the scaled modulation index,
- an exponentiator for exponentiating the normalized CPM signal into a reconstructed CPM signal having inphase and quadrature CPM components, and
- a demodulator for demodulating the inphase and quadrature CPM components into the estimate of the original bit stream.

8. The receiver of claim 7 wherein the demodulator comprises, a pulse amplitude modulation matched filter for providing Laurent filtered pulse amplitude modulation complex I and Q components, a sampler for alternately sampling the pulse amplitude modulation complex I and Q components into alternating samples, and a sign determinator for determining the sign of the alternating samples for generating the estimate of the original bit stream.

9. The receiver of claim 7 wherein the demodulator comprises,
- a pulse amplitude modulation matched filter for providing Laurent pulse amplitude modulation filtered complex I and Q components,
- a sampler for alternately sampling the pulse amplitude modulation complex I and Q components into alternating samples, and
- a sign determinator for determining the sign of the alternating samples for generating the estimate of the original bit stream, wherein, the original bit stream is a precoded original bit stream.

10. The receiver of claim 7 wherein the demodulator comprises,
- a pulse amplitude modulation matched filter for providing Laurent filtered pulse amplitude modulation complex I and Q components,
- a sampler for alternately sampling the pulse amplitude modulation complex I and Q components into alternating unequalized samples,
- a least mean square equalizer for generating equalized samples from the alternating unequalized samples, and
- a sign determinator for determining the sign of the equalized samples for generating the estimate of the original bit stream.

* * * * *